United States Patent
Hart et al.

(10) Patent No.: US 12,369,050 B2
(45) Date of Patent: Jul. 22, 2025

(54) UPLINK PERFORMANCE USING MULTIPLE WIRELESS DEVICES

(71) Applicant: T-Mobile Innovations LLC, Overland Park, KS (US)

(72) Inventors: Kevin A. Hart, Sammamish, WA (US); Nagi A. Mansour, Arlington, VA (US); Akin Ozozlu, McLean, VA (US)

(73) Assignee: T-Mobile Innovations, LLC, Overland Park, KS (US)

( * ) Notice: Subject to any disclaimer, the term of this patent is extended or adjusted under 35 U.S.C. 154(b) by 389 days.

(21) Appl. No.: 17/897,389

(22) Filed: Aug. 29, 2022

(65) Prior Publication Data

US 2024/0073706 A1    Feb. 29, 2024

(51) Int. Cl.
*H04W 24/02* (2009.01)
*H04W 4/02* (2018.01)
*H04W 84/18* (2009.01)

(52) U.S. Cl.
CPC .......... *H04W 24/02* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 9,760,843 B1 * | 9/2017 | Martin | G06Q 10/02 |
| 10,645,539 B2 | 5/2020 | Ahn et al. | |
| 12,010,061 B2 * | 6/2024 | Kim | H04W 4/44 |
| 2010/0113059 A1 * | 5/2010 | Morimoto | H04W 16/02 |
| | | | 455/452.2 |
| 2019/0313279 A1 * | 10/2019 | Li | H04W 72/12 |
| 2021/0282200 A1 * | 9/2021 | Chourasia | H04W 16/02 |
| 2022/0053297 A1 | 2/2022 | Yim | |
| 2022/0256591 A1 * | 8/2022 | Wang | H04W 74/002 |
| 2023/0081131 A1 * | 3/2023 | Selvanesan | H04W 72/20 |
| | | | 370/329 |
| 2023/0148128 A1 * | 5/2023 | Sambhwani | H04W 4/08 |
| | | | 455/518 |
| 2023/0422235 A1 * | 12/2023 | Singh | H04L 1/1887 |
| 2024/0172235 A1 * | 5/2024 | Pan | H04W 72/02 |
| 2024/0422511 A1 * | 12/2024 | Rao | H04W 4/08 |
| 2025/0031186 A1 * | 1/2025 | Zhao | H04W 72/044 |

* cited by examiner

*Primary Examiner* — Duc T Duong
(74) *Attorney, Agent, or Firm* — Jones Robb, PLLC (57) ABSTRACT

Systems and methods are provided for uplink quality enhancement. Methods include experiencing a triggering condition at a wireless device in a network and identifying at least one additional wireless device in the network within a threshold proximity to the wireless device experiencing the triggering condition. The method additionally includes forming a group with the at least one additional wireless device using a communication link and pooling uplink resources with the at least one additional wireless device to improve uplink performance of the wireless device experiencing the triggering condition.

19 Claims, 9 Drawing Sheets

UPLINK PERFORMANCE USING MULTIPLE WIRELESS DEVICES

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. Wireless devices closer to a 5G antenna are more likely to receive the benefits of the 5G technology. Access to high data speeds is improved if a high signal to interference and noise ratio (SINR) is present. Accordingly, when a wireless device moves further from an antenna, the wireless device is likely to experience a decrease in quality of service (QoS).

Some devices are better able to transmit from a cell edge area than others. For example, high power user equipment (HPUE) may have multiple transmitters and can successfully transmit from a greater distance on the uplink than low power user equipment (LPUE). Thus, HPUEs are capable of transmitting at a maximum allowable transmit power that is higher than lower power class UEs (LPUEs).

Regardless of the transmit power of a given wireless device, at some distance from the communicating access node, the device will have difficulty transmitting to the access node. In some circumstances, the wireless device will be subject to a handover to another access node. However, as handovers can cause delays and interruptions and consume resources, it is often advantageous for devices to remain connected to an access node.

In areas with a large number of wireless devices, some devices may be transmitting infrequently and other devices may be transmitting large quantities of data in the uplink. Thus, within a particular area experiencing a decrease in QoS and poor radio frequency (RF) conditions, a solution is needed for increasing uplink capabilities for wireless devices by leveraging the capabilities of other proximal wireless devices.

Overview

Exemplary embodiments described herein include systems, methods, wireless devices, access nodes, and non-transitory computer readable mediums for improving uplink performance through grouping of wireless devices. An exemplary method includes experiencing a triggering condition at a wireless device in a network and upon experiencing the triggering condition, identifying at least one additional wireless device in the network within a threshold proximity to the wireless device experiencing the triggering condition. The method further includes forming a group with the at least one additional wireless device using a communication link and pooling uplink resources with the at least one additional wireless device to improve uplink performance of the wireless device experiencing the triggering condition.

A further exemplary embodiment includes a wireless device having at least one processor programmed to perform multiple operations in order to enhance uplink performance. The operations include identifying a triggering condition for forming a group of wireless devices in a network and identifying at least one additional wireless device within a threshold proximity to the wireless device experiencing the triggering condition. The operations further include forming a group with the at least one additional wireless device using a communication link and pooling uplink resources with the at least one additional wireless device to improve uplink performance of the wireless device experiencing the triggering condition.

In yet a further exemplary embodiment, a system is provided for uplink quality enhancement. The system includes multiple wireless devices and an access node in communication with the multiple wireless devices. The system further includes one wireless device of the multiple wireless devices experiencing a triggering condition for forming a group of wireless devices selected from the multiple wireless devices. The one wireless device initiates formation by identifying at least one additional wireless device within a threshold proximity and forms a group with the at least one additional wireless device using a communication link. The wireless device pools uplink resources with the at least one additional wireless device to improve uplink performance of the wireless device experiencing the triggering condition.

Additional exemplary embodiments include a non-transitory computer readable medium, programmed to perform the operations set forth above. Further, in embodiments set forth herein, the access node may include programming for detecting the triggering condition and forming the group of wireless devices in order to improve uplink performance

DETAILED DESCRIPTION

Exemplary embodiments described herein include systems, methods, wireless devices, and computer readable mediums for improving uplink quality by dynamically forming wireless device groups. By forming the group, the wireless devices can combine their data rates to improve overall uplink performance. The wireless devices can be staggered in the time domain to enable separating information in the uplink from each wireless device and the data rates for the wireless devices in the group can be combined.

Thus, the wireless devices may either be synchronized or the uplink information can be separated by code division multiplexing (CDM) codes.

In particular, embodiments set forth herein include enhanced logic for evaluating a triggering condition at a wireless device. Upon recognition of the triggering condition the wireless device may attempt to form a group. The triggering condition can be set by a network operator and detected by the access node or be set within the wireless device and may be detected by the wireless device. The triggering condition may reflect poor RF conditions and may be based on downlink or uplink measurements. The triggering condition may include, for example, uplink noise, uplink quality, power left in the wireless device, reference signal received power (RSRP), reference signal received quality (RSRQ), or signal to noise and interference ratio (SINR). Additionally, the triggering condition can incorporate a wireless device location, e.g., distance from the access node or distance from a coverage boundary. These factors may also be combined to create a triggering condition.

In embodiments provided herein, enhanced logic dynamically enables the wireless device to search for potential group members once the triggering condition has been recognized. Recognition of the triggering condition may include, for example, recognizing that the wireless device is experiencing RSRP below a specified threshold and is at least a predetermined distance from the access node. In embodiments set forth herein, the potential group members are within close proximity to the wireless device experiencing the triggering condition. The wireless device experiencing the triggering condition may discover potential group members using, for example, Bluetooth or Wi-Fi, such that all members of the group will have a connection to each other member of the group and thus the capacity to build a group that functions as an ad hoc network to share resources.

By adding data links together, group expands coverage and enhances performance, for example, at cell edge locations. In embodiments set forth herein, cell edge locations may be defined within a network as being a particular distance from a base station or from a coverage boundary. In some embodiments, the wireless devices may form a group having one ID, and in other embodiments, each wireless device may have its own ID.

Accordingly, in embodiments set forth herein, when wireless device users reach marginal areas of coverage, the system provides the wireless device with better uplink performance by utilizing dynamic group formation. Wireless device users may be able to utilize enhanced group formation logic to activate settings dictating when and with what other devices they will allow a group to formed. This enhanced logic may operate, for example, by providing menu selections on a user interface allowing the wireless device user to make selections. Wireless device users may be able to allow group formation with any other user in the network, with users having the same carrier, or with users on the same family plan. Furthermore, wireless device users may be able to limit wireless device group formation based on percentage of remaining battery life for the wireless device.

Thus, in embodiments set forth herein, a dynamic grouping mechanism groups wireless devices based on a condition comparison. Generally, wireless devices further from the access node or in an overlapping coverage area or area with interference will utilize dynamic group formation.

In embodiments disclosed herein, a cell or wireless network may be provided by an access node. The access node may utilize one or more antennas to communicate with wireless devices or user equipment (UEs). Performance at a particular wireless device may be dependent on a number of factors including, for example, signal strength parameters and interference indicators. Values such as SINR, RSRP, RSRQ, or other measurements may be periodically measured and reported by the wireless devices over a communication network to an access node. Additional signal performance parameters may be reported, including, for example, channel quality indicator (CQI), and rank index (RI).

By electing to operate as a group based on a trigger condition for a wireless device, performance is maintained for wireless devices in the network and latency is reduced. Additional factors may be integrated with the triggering condition, such as antenna performance parameters, network loading conditions, and wireless device location within a cell or a sector. Thus, as described herein, detecting the triggering condition may include detecting a signal strength meeting a predetermined threshold. For example, RSRP or SINR at the wireless device may diminish to a level such that the connection is interrupted. However, when wireless devices move closer to an access node and no interference is present, the signal strength increases. When signal strength for a wireless device meets a predetermined network defined threshold, group formation may be disabled. Further, the signal strength may be monitored on a continual basis, such that when the signal strength for the wireless device deteriorates, group formation may again be enabled.

In embodiments set forth herein, the network may be a 4G LTE network 5G NR network or a combined 4G/5G network. Other networks are within scope of the disclosure. Wireless devices may travel throughout the network measuring and reporting performance parameters. Methods performed herein may be performed in response to the measured performance parameters from the wireless devices. In some embodiments, the wireless device may independently implement group formation and in other, the access node, for example a gNodeB, may signal the wireless device and instruct it regarding group formation.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, or gNodeB, and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamic group formation may be implemented as computer-readable instructions implemented by a wireless device or network nodes such as processing nodes. The processing node may include a processor included in the access node or a processor included in any controller node in the wireless network that is coupled to the access node.

Figure 1:
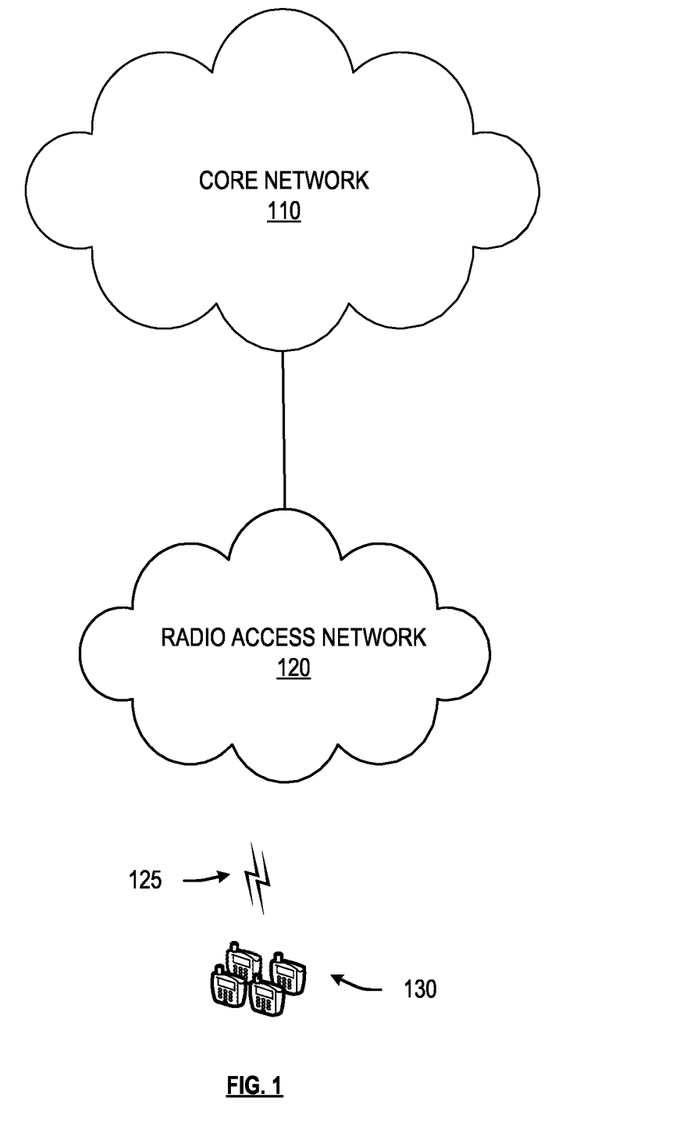
FIG. 1 depicts an exemplary system for wireless communication, in accordance with the disclosed embodiments.

FIG. 1 depicts an exemplary communication network 100. A core network 110 is coupled to a radio access network (RAN) 120 that serves wireless devices 130 over communication links 125. For example, the wireless devices 130 can be end-user wireless devices (e.g., UEs), communication links 125 use 5G NR, 4G LTE, or any other suitable type of radio access technology (RAT), and core network 110 can be structured using a service-based architecture (SBA) utilizing core network functions and elements, including, for example, user plane functions (UPF) control plane functions (CPF).

The RAN 120 can include various access network functions and devices disposed between the core network 110 and the end-user wireless devices 130. For example, the RAN 120 includes at least an access node (or base station), such as an eNodeB and/or gNodeB communicating with the plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) capable of communicating signals and carrying data, for example, to support voice, push-to-talk, broadcast video, and data communications by end-user wireless devices 130. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR). The CPF can provide one or more network functions based on a request-response or subscribe-notify model. The network functions may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 110. To use other network functions, registered functions can send service requests to the NRF.

The UDM interfaces with network functions such as AMF and SMF so that relevant data becomes available to AMF and SMF. The UDM generates authentication vectors when requested by the AUSF, which acts as an authentication server. The AMF performs the role of access point to the 5G core, thereby terminating RAN control plane and UE traffic originating on either the N1 or N2 reference interface. In the 5G core, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Wireless devices 130 may be any device, system, combination of devices, or other such communication platform capable of communicating wirelessly with RAN 120 using one or more frequency bands deployed therefrom. Each of wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via RAN 120. Wireless devices 130 may also include, for example Internet of Things (IoT) devices. Other types of communication platforms are possible.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
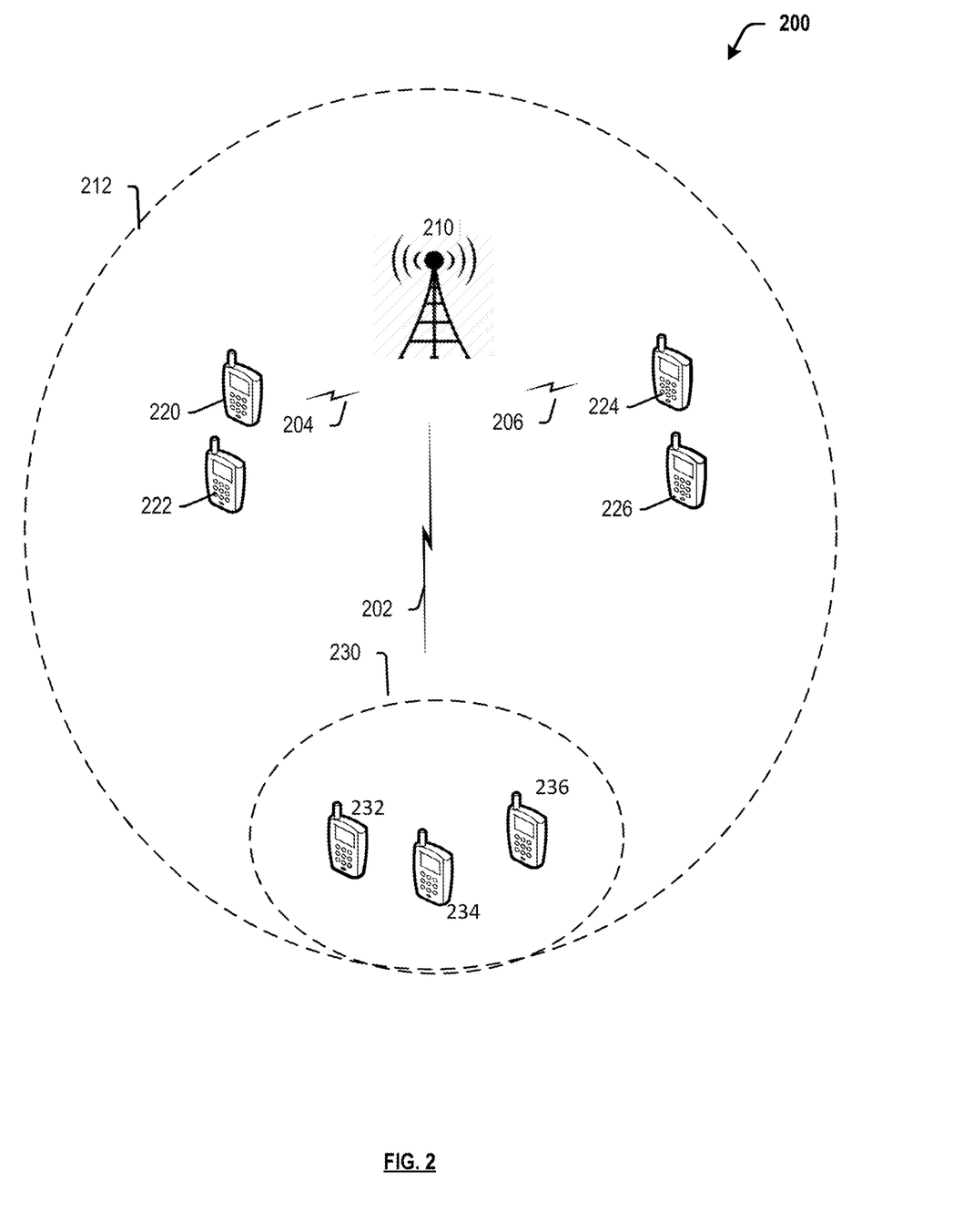
FIG. 2 depicts an access node communicating with wireless devices in accordance with disclosed embodiments.

FIG. 2 depicts an exemplary environment 200 for embodiments set forth herein. A single access node 210 may deploy one or more RATs. The access node 210 have operate within a coverage area 212 by deploying wireless links 202, 204, and 206 to communicate with wireless devices 220, 22, 224, 226, 232, 234, and 236. The wireless links may correspond to different frequency bands and/or different bandwidths. Further, the wireless devices 220, 222, 224, 226, 232, 234, and 236 may be varying distances from the access node 210 and may be experiencing varying RF conditions. The access node 210 may be or include, for example, a gNodeB and/or eNodeB.

Coverage area 212 is shown as having a defined boundary and signal parameters may vary between the access node 210 and the boundary. Specifically, signal parameters generally deteriorate as devices progress towards the boundary of the coverage area 212. For example, signal to noise plus interference (SINR) or RSRQ may decrease with distance from the access node 210 to the boundary of the coverage area 212. Further, pathloss may be high relative to other regions within the coverage area 212. However, signal quality may also decrease in areas confronted with environment or geographical signal barriers. More power is required to transmit signals in the aforementioned areas and some wireless devices may have insufficient power for uplink transmission.

In operation, UEs 220, 222, 224, and 226 may be experiencing strong RF signal parameters due to their proximity to the access node 210. The wireless devices may connect to the access node 210 over wireless links 204 and 206 using one or more RATs. UEs 232, 234, and 236 are located further from the access node 210 and therefore may be experiencing degraded RF signal parameters. Although UEs 232, 234, and 236 are distant from the access node 210, they are relatively close to one another. Thus, the wireless devices may be able to communicate with one another, using, for example, Bluetooth or Wi-Fi. Accordingly, in embodiments provided herein, the wireless devices 232, 234, and 236 may form a group 230. The group 230 may pool resources to increase uplink data rate and thereby improve range and power for the wireless devices 232, 234, and 236 in the group 230. As will be explained further herein, the formation of the group 230 may be triggered by one or more of the wireless devices 232, 234, and 236 experiencing a triggering condition. The number of wireless devices in the group 230 is merely exemplary as many more wireless devices may be included.

Figure 3:
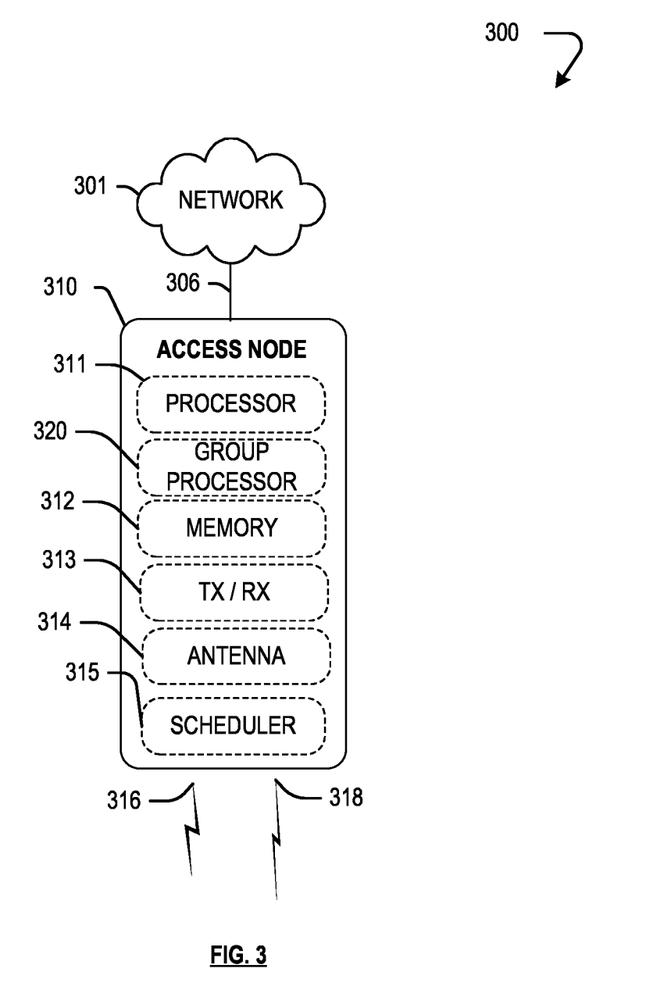
FIG. 3 depicts an exemplary access node in accordance with disclosed embodiments.

FIG. 3 illustrates an operating environment 300 for an exemplary access node 310 in accordance with the disclosed embodiments. In exemplary embodiments, access node 310 can include, for example, a gNodeB or an eNodeB. Access node 310 may comprise, for example, a macro-cell access node, such as access node 210 described with reference to FIG. 2. Access node 310 is illustrated as comprising a processor 311, memory 312, transceiver(s) 313, and antenna(s) 314. Processor 311 executes instructions stored on memory 312, while transceiver(s) 313 and antenna(s) 314 enable wireless communication with other network nodes, such as wireless devices and other nodes. For example, wireless devices may initiate uplink transmissions such that the transceivers 313 and antennas 314 receive messages from the wireless devices, for example, over communication links 316 and 318 and pass the messages to a mobility entity in the core network. Further, the transceivers 313 and antennas 314 receive signals from the mobility entity such as an MME or AMF and pass the messages to the appropriate wireless device. Scheduler 315 may be provided for scheduling resources based on the presence and performance parameters of the wireless devices. Network 301 may be similar to network 101 discussed above.

In embodiments provided herein, processor 311 may operate in conjunction with scheduler 315 to compare a performance parameters and/or location information of a wireless device, such as, for example, SINR or RSRP and/or distance from the cell edge, to a triggering condition in the memory 312 or in an accessible database to determine if the current conditions of the wireless device meet the triggering condition. In embodiments set forth herein, the cell edge can be defined based on a distance of the wireless device from the access node or based on a distance from a coverage boundary.

In some embodiments, the access node 310 may include a group processor 320 for performing the comparison with the triggering condition and instructing wireless device when group formation is triggered. In embodiments provided herein, meeting the triggering condition activates group formation and the failure to meet the triggering condition deactivates group formation. Thus, when wireless device conditions reach the triggering condition, the group processor 320 may determine that group formation should be active. When wireless device conditions stop meeting the triggering condition, the group processor 320 may deactivate group formation. The group processor 320 may utilize any of multiple parameters indicating wireless device conditions. For example, the condition may be determined by RSRP, RSRQ, uplink noise, SNR and/or SINR. Further, the access node 310 may consider wireless device location and remaining wireless device power.

Further, in some embodiments, the group processor 320 may locate wireless devices proximal to the wireless device meeting the triggering condition and cause the wireless device meeting the triggering condition to be notified of the proximal wireless devices. Thus, the access node 310 may utilize transceiver 313 and antenna 314 to send an instruction to the wireless device in order to disable or enable group formation. Typically, the access node 310 may disable group functionality when the wireless device is moving closer to the access node 310 and enable group functionality when the wireless device is moving into a cell edge area further from the access node 310. In other embodiments, the group processor 320 is not needed as the wireless devices are equipped with necessary group formation tools as will be further described below.

Figure 4:
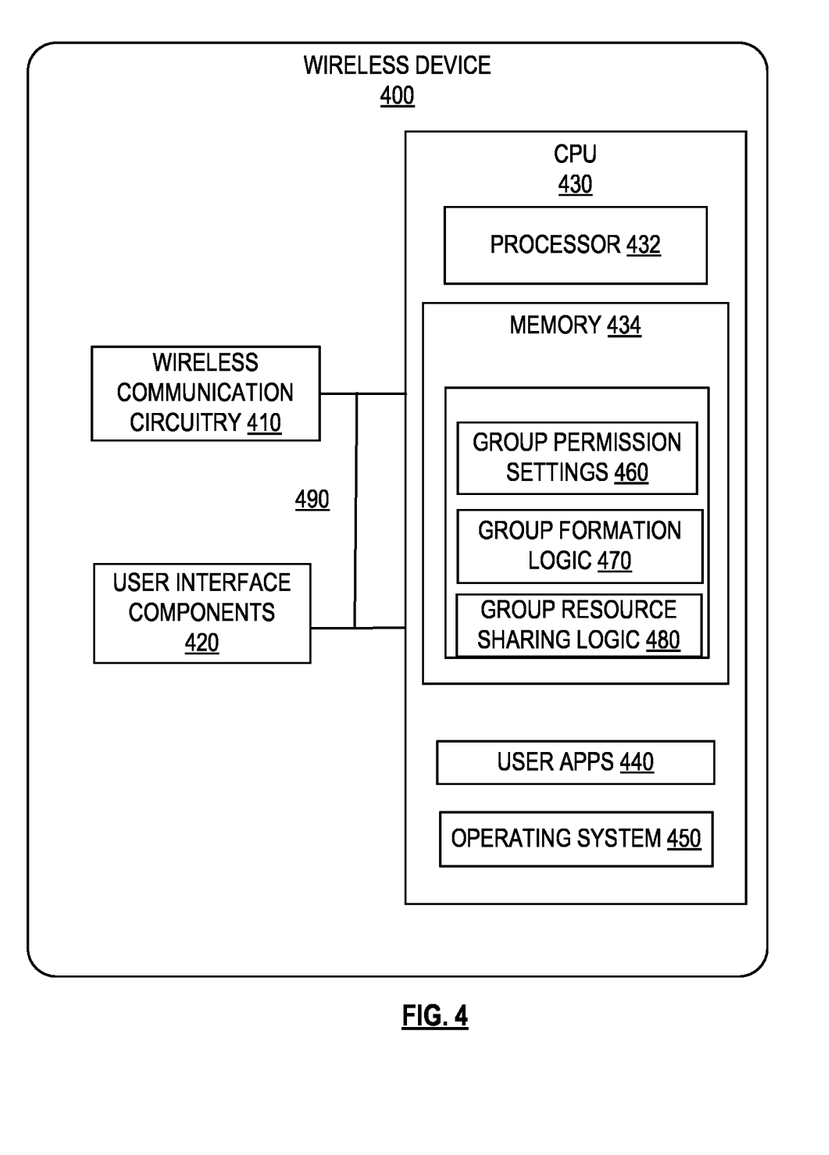
FIG. 4 depicts an exemplary wireless device in accordance with disclosed embodiments.

FIG. 4 depicts a wireless device (UE) 400 in accordance with disclosed embodiments. The wireless device 400 may correspond to one of wireless devices 130 in FIG. 1 or the wireless devices 220, 22, 224, 226, 232, 234, and 236 shown in FIG. 2. As illustrated, the wireless device 400 includes wireless communication circuitry 410, user interface components 420, a central processing unit (CPU) 430, processor 422, memory 434, user apps 440, and operating system 450. Components may be connected, for example, by a bus 490. These components are merely exemplary and the wireless device 400 may include a larger or smaller number of components capable of preforming the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 434 may store, for example group permission settings 460, group formation logic 470, and group resource sharing logic 480. When executed by the processor 432, the programming shown initiates and performs the method described below with reference to FIGS. 5-9.

The group permission settings 460 may be set on each wireless device in order to designate whether a group can be formed, under what conditions a group can be formed, and what other wireless devices will be permitted into the group. The group permission settings 460 may be displayed, for example, in a settings menu of the wireless device 400. Wireless device users may be able to selectively activate and deactivate the group permission settings 460. Furthermore, wireless devices users may be able to set the group permission settings 460 to deactivate group formation when battery power for the wireless device falls below a certain percentage, e.g., 30%. Additionally, the menu for the group permission settings 460 may enable users to determine what other wireless devices are eligible for group membership. For example, the wireless device group permission settings 460 may enable the wireless device user to allow all wireless devices with the same carrier as the wireless device 400 to join the group. Alternatively, the wireless device group permission settings 460 may enable the wireless device user to allow only family plan members to join the group. As a further alternative, the wireless device group permission settings may allow all other wireless devices to join the group. In some embodiments, the wireless device group permission settings 460 may be manipulated to limit the number of a group members to a particular number. Other permission settings 460 may be included and are within scope of the disclosure.

The group formation logic 470 may handle group formation or may optionally operate in conjunction with an access node, such as access node 310 to manage group formation. For example, the group formation logic 470 may determine when the wireless device conditions meet the triggering condition. Thus, the group formation logic 470 may activate group formation when the wireless device condition meets the triggering condition and may deactivate group formation when the wireless device condition does not meet the triggering condition. Further, the group formation logic 470 may operate in conjunction with other wireless device components to identify proximal devices eligible to participate in group formation and send a message to the eligible devices.

The group resource sharing logic 480 may operate in conjunction with the processor 432 to manage group operations once a group, such as the group 230 of FIG. 2 is formed. For example, the group resource sharing logic can cause all data links to be combined in order to expand coverage and performance. Further, the group resource sharing logic 380 can cause the wireless devices to pool uplink capabilities by encrypting the data and having one wireless device send the data on behalf of the others. In some embodiments, the group resource sharing logic 380 allows each wireless device to have its own radio link. In other embodiments, the group resource sharing logic enables the wireless devices to contribute to a single bearer, thus creating one radio link through combined data rates. In this embodiment, the formed group has one ID and each device sends data that is reassembled by the network.

The wireless communication circuitry 410 may include circuit elements configured to generate wireless signals (e.g., one or more antennas) as well as interface elements configured, for example, to translate control signals from the CPU 330 into data signals for wireless output. Further, the wireless communication circuitry 410 may include multiple elements, for example to communicate in different modes with different RATs. The CPU 430 may be configured to receive, interpret, and/or respond to signals received via the wireless communication circuitry 410. The CPU 430 may be configured to receive a network command (e.g., from an access node such as the RAN 120) to perform other specified functions. The user interface components 420 may be or include any components enabling a user to interact with the wireless device 400, including tools for managing the group permission settings 460.

Accordingly, in the embodiment described with respect to FIG. 4, more robust data transmission is provided for the wireless device 400 so that the device remains active while it is in a location experiencing poor RF conditions. Further, more accurate UL power control is enabled for the wireless device 400.

Figure 5:
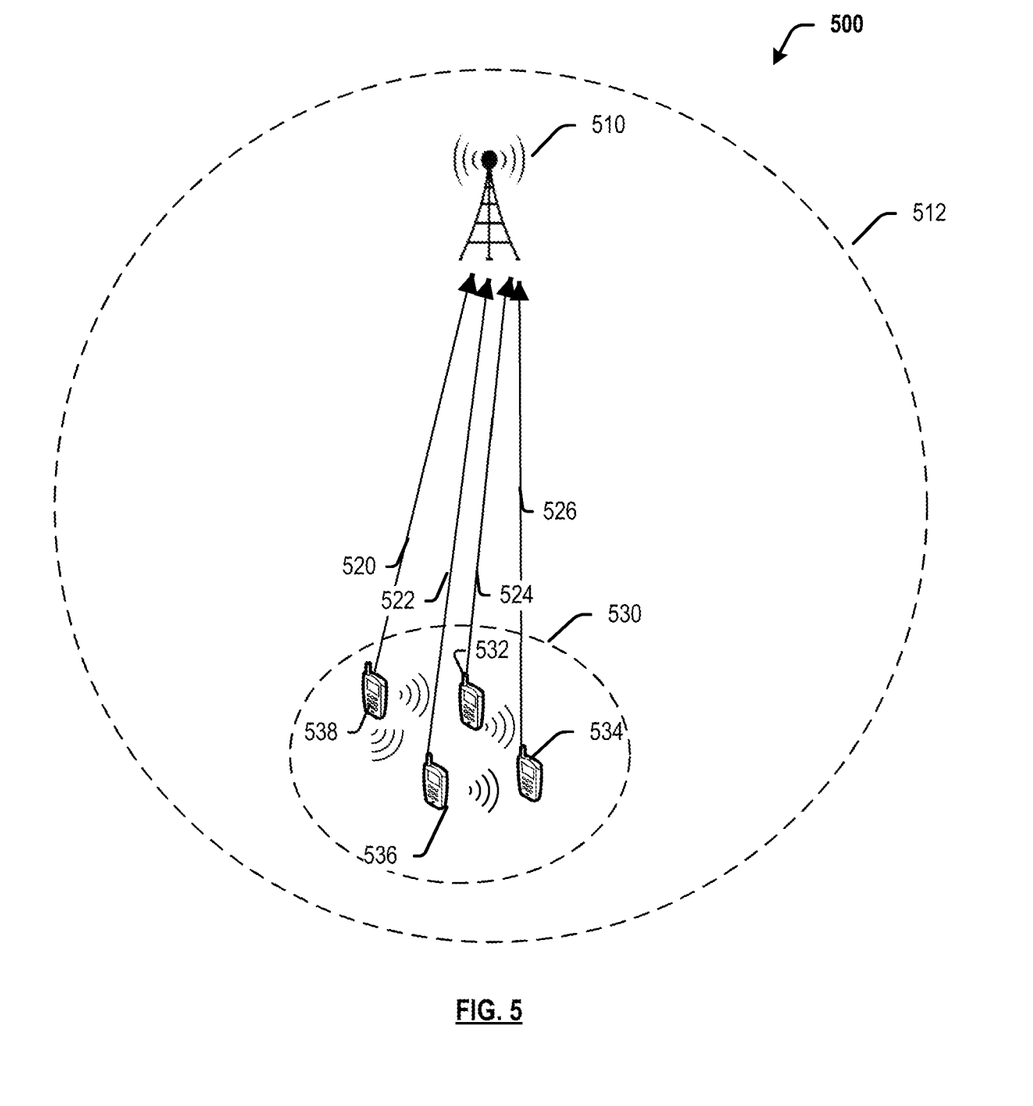
FIG. 5 is a diagram illustrating group operation in accordance with one disclosed embodiment.

FIG. 5 illustrates a scenario 500 for resource sharing within a wireless group 530 in accordance with embodiments described herein. An access node 510 transmits and receives signals within a coverage area 512. Wireless devices 532, 534, 536, and 538 form a group 530. Each wireless device has a separate uplink radio connection or channel with the access node 510. For example, wireless device 532 communicates with the access node 510 using a radio link 524. Wireless device 534 communicates with the access node 510 using a radio link 526. Wireless device 536 communicates with the access node 510 using radio link 522 and wireless device 538 communicates with the access node 510 using the radio link 520. However, the wireless devices 532, 534, 536, and 538, are able to communicate with one another using Bluetooth or Wi-Fi communication links as shown.

Thus, the wireless devices 532, 534, 536, and 538 within the group 530 are able to utilize their own IDs, but share resources. The devices use Bluetooth or Wi-Fi outside of the cellular network to create an ad hoc network. While Wi-Fi has greater range, it consumes more power, thus lower power consumption can be achieved by using Bluetooth. The wireless devices 532, 534, 536, and 538 send information to each other over the ad hoc network and send data up to the access node 510. Thus, one wireless device can send data for another as the data is shared initially over the ad hoc network. The access node 510 can then reassemble the data. All of these steps can occur without the knowledge of the wireless devices 532, 534, 536, and 538. The group resource sharing logic 480 is configured to ensure that the wireless devices are staggered in the time domain or alternatively can separate information from the wireless devices with CDM codes. Thus, the access node 510 accumulates the individual channels and reassembles them.

Figure 6:
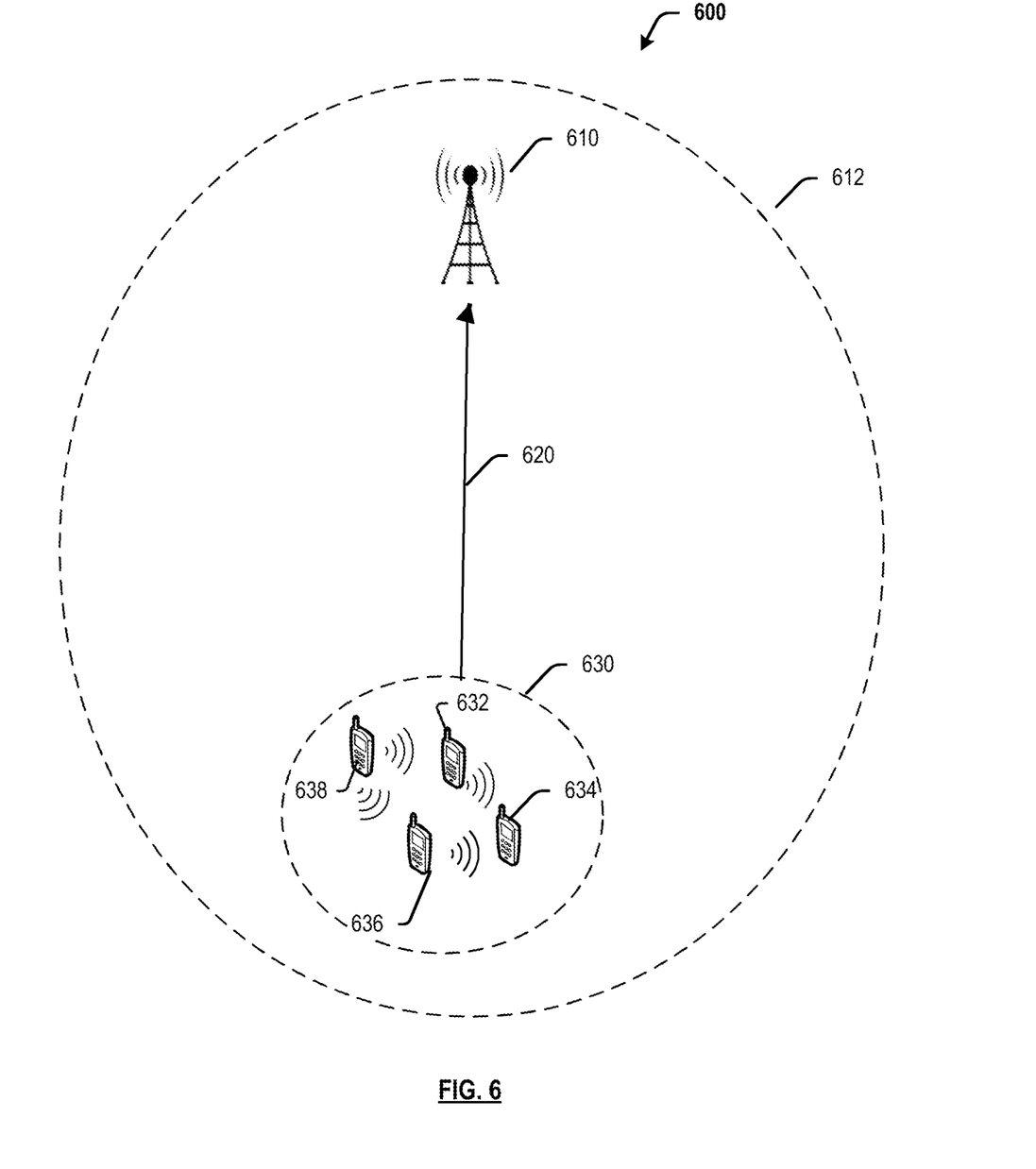
FIG. 6 is a diagram illustrating group operation in accordance with a further disclosed embodiment.

FIG. 6 illustrates a scenario 600 for resource sharing within a wireless group 630 in accordance with embodiments described herein. An access node 610 transmits and receives signals within a coverage area 612. Wireless devices 632, 634, 636, and 638 form a group 630. The wireless devices 632, 634, 636, and 638 in the group 630 share an uplink channel 620 for communicating with the access node 610.

Accordingly, with network modifications, such as the group processor 320 of the access node 310, all of the wireless devices 632, 634, 636, and 638 could all contribute to a single joint bearer 620. One of the wireless devices may function as a controlling device. However, each device contributes data so that the combination of data is sufficient to establish a connection. In this embodiment, the group 630 may be represented by a single ID. The access node 610 may see the group 630 as one wireless device that has been allocated a large number of physical resource blocks (PRBs). While the devices may have insufficient throughput to support a channel individually, their combined throughput supports a single joint channel 620. Thus, the controlling wireless device accesses transmitters of the other wireless devices but sends the data up to the access node 610. For example, wireless device 622 may function as the controlling wireless device accessing the transmitters of wireless devices 624, 626, and 628.

The wireless devices 622, 624, 626, and 628 must be sufficiently proximal to communicate with one another, but in embodiments may utilize multi-user multiple input and multiple output (MU-MIMO) technologies for multipath wireless communication in order to communicate with one another. MU-MIMO helps this by allowing multiple users to access router functions without the congestion. MU-MIMO technology breaks up the available bandwidth into separate, individual streams that share the connection equally. In this embodiment, the wireless devices may be further apart. In embodiments set forth herein, the group processor 320 of the access node may notify the wireless device of another proximal wireless device. Wireless devices may additionally or alternatively try to communicate using Bluetooth or Thus, the controlling wireless device 622 may control the channel up to the access node 610, but access transmitters from the wireless devices 624, 626, and 628 for assistance.

The solution set forth herein improves upon HPUEs, which may utilize two radios working in synchronization to double the power and improve range. The capacity to improve the power and range of HPUEs is limited by the space available in the wireless device. Using a group to combine multiple wireless devices as set forth herein removes the physical limitations inherent in HPUEs. However, the benefits of range extension, performance improvement, and power density improvements are still apparent.

Figure 7:
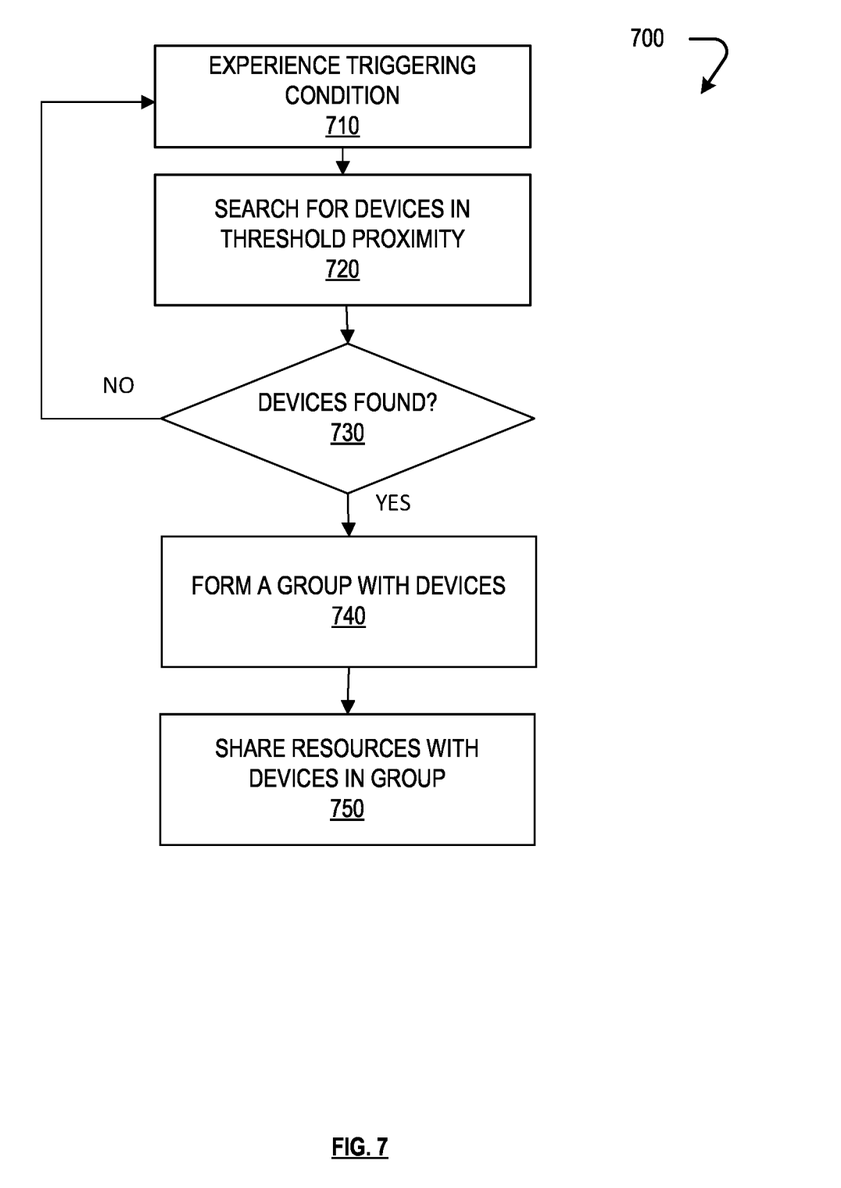
FIG. 7 is a flow diagram depicting a method of group formation and implementation in accordance with disclosed embodiments.

The disclosed methods for group formation for uplink performance improvement are further described with reference to FIGS. 7-9. FIG. 7 illustrates an exemplary method 700 performed by a wireless device or a wireless device in combination with an access node for dynamic group formation. Method 700 may be performed by any suitable processor discussed herein, for example, the processor 432 included in the wireless device 400 or the wireless device processor 432 in combination with an access node processor 311 or a processor included in a controller node. For the sake of convenience, the method is described as being performed by the wireless device 400.

Method 700 starts in step 710, when the wireless device 400 experiences a triggering condition as explained above. The triggering condition may equate to a value of a single RF parameter or may involve a combination of RF parameters, such as for example, uplink noise, SINR, SNR, RSRQ, or RSRP. The triggering condition may include a threshold for one or more parameters. When one or more of the thresholds is reached, the triggering condition is met. A threshold may further be set based on device location (e.g., a predetermined distance from the access node), and device battery power available.

In step 720, the wireless device 400 searches for devices in within a threshold proximity. The threshold proximity may, be determined for example, by the range of Bluetooth or Wi-Fi technologies. In one embodiment, the wireless device 400 may first search for neighboring devices using Bluetooth as it uses less power than Wi-Fi. If the wireless device 400 is unable to find any neighboring devices using Bluetooth, it may then attempt to use Wi-Fi, which has greater range than Bluetooth. If no neighboring devices are found at 730, the wireless device 400 may continue to search for devices within the threshold proximity as long as the triggering condition continues to be met.

Once neighboring devices are found at 730, the wireless device 400 may form a group with the one or more neighboring devices at 740. As set forth above, the formation of a group includes checking permission settings for the proximal wireless devices.

In step 750, the wireless device 400 shares resources with other wireless devices in the group as explained above. For example, the group resource sharing logic 380 can cause all data links to be combined in order to expand coverage and performance. Further, the group resource sharing logic 380 can cause the wireless devices to pool uplink capabilities by encrypting the data and having one device send data on behalf of the others. In some embodiments, the group resource sharing logic 380 allows each wireless device to have its own radio link with available combined data rates. For example, if the wireless devices individually have a data rate of 128 kb/s, then four wireless devices in a group would have a combined data rate of 512 kb/s. In other embodiments, the group resource sharing logic enables the wireless devices to contribute to a single bearer, thus creating one radio link through combined data rates. In this embodiment, the formed group has one ID and each device sends data that is reassembled by the network. Resource sharing provides the benefits of range extension, performance improvement, and power density improvement.

Figure 8:
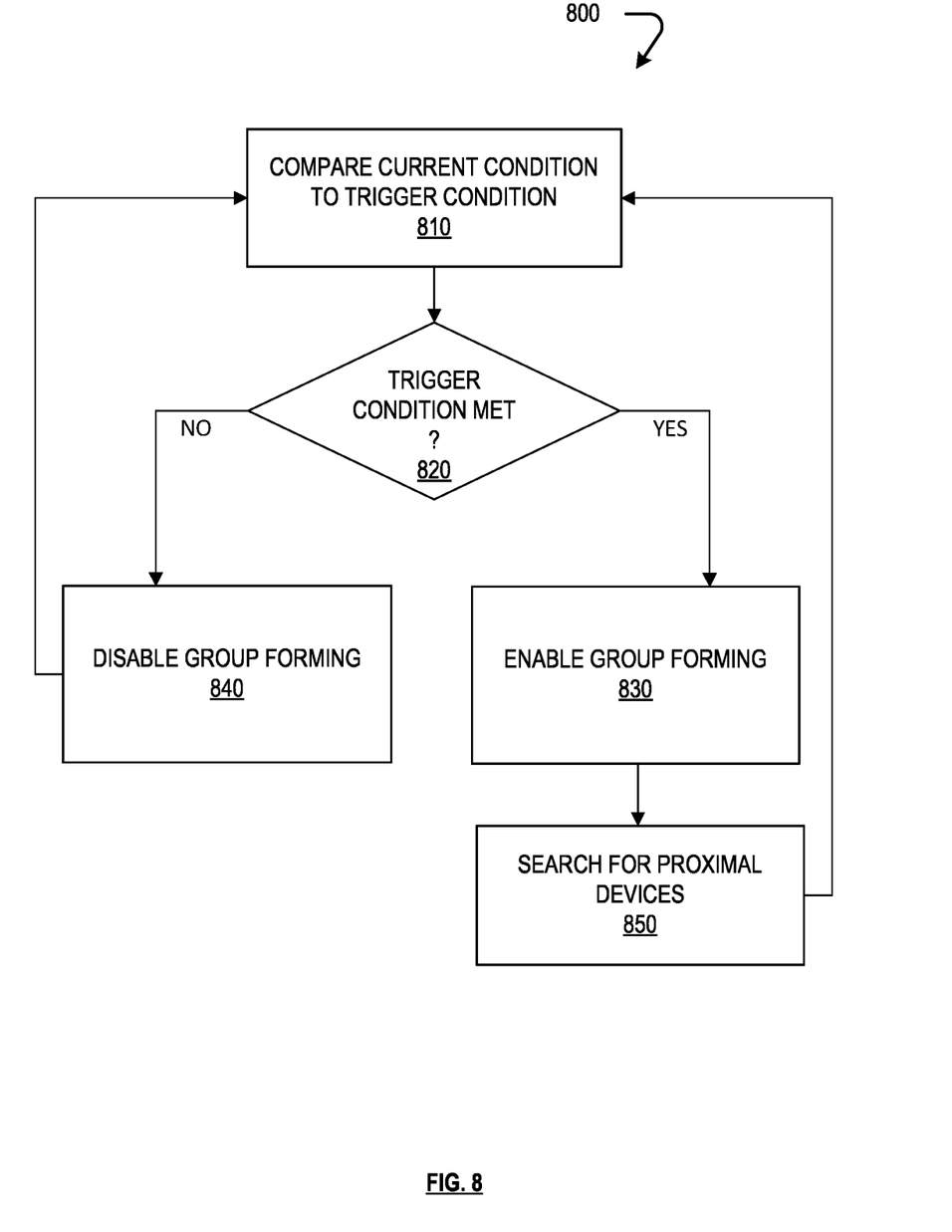
FIG. 8 is a flow chart depicting a method for group formation in accordance with disclosed embodiments.

FIG. 8 illustrates a method 800 for determining when a wireless device may form a group. Method 800 may be performed by a processor, for example, the processor 432 in the wireless device 400. Alternatively, the steps may be performed by a processor of an access node, such as the processor 311 of the access node 310. For the sake of illustration, the method is described as being performed by the wireless device 400. In some embodiments, the method 800 may be performed in a network under any conditions and in other embodiments, the method 800 may only be performed in a network experiencing load below a predetermined loading threshold.

In step 810, the wireless device 400 compares its current condition to the triggering condition. The wireless device 400 may store the triggering condition in memory. As set forth above, the triggering condition may be or include one or more RF parameters and may additionally or alternatively include location information. The wireless device 400 determines if the current condition, reflected by measured performance parameters or location meets the triggering condition. For example, the wireless device 400 may compare a measured value of SINR or RSRP with a stored threshold. If the measured value meets the threshold at 820, the wireless device 400 may enable group formation in step 830. If the current condition of the wireless device does not meet the triggering condition at 820, the wireless device 400 may disable group formation at step 840.

When group formation is enabled at step 830, the wireless device 400 may search for proximal devices for group formation in step 850. As set forth above, the search for proximal devices may be executed utilizing Bluetooth and/or Wi-Fi technologies.

If the access node 310 performs the above steps, the access node 310 may store the triggering condition and may also receive measurement reports, such as channel state information (CSI) reports from the wireless devices in order to compare measured performance parameters to the triggering condition.

Accordingly, in embodiments set forth herein, the wireless device 400 may be moving closer to the access node and will no longer meet the triggering condition. Further, the wireless device 400 may be moving further from the access node and therefore may meet the triggering condition.

Figure 9:
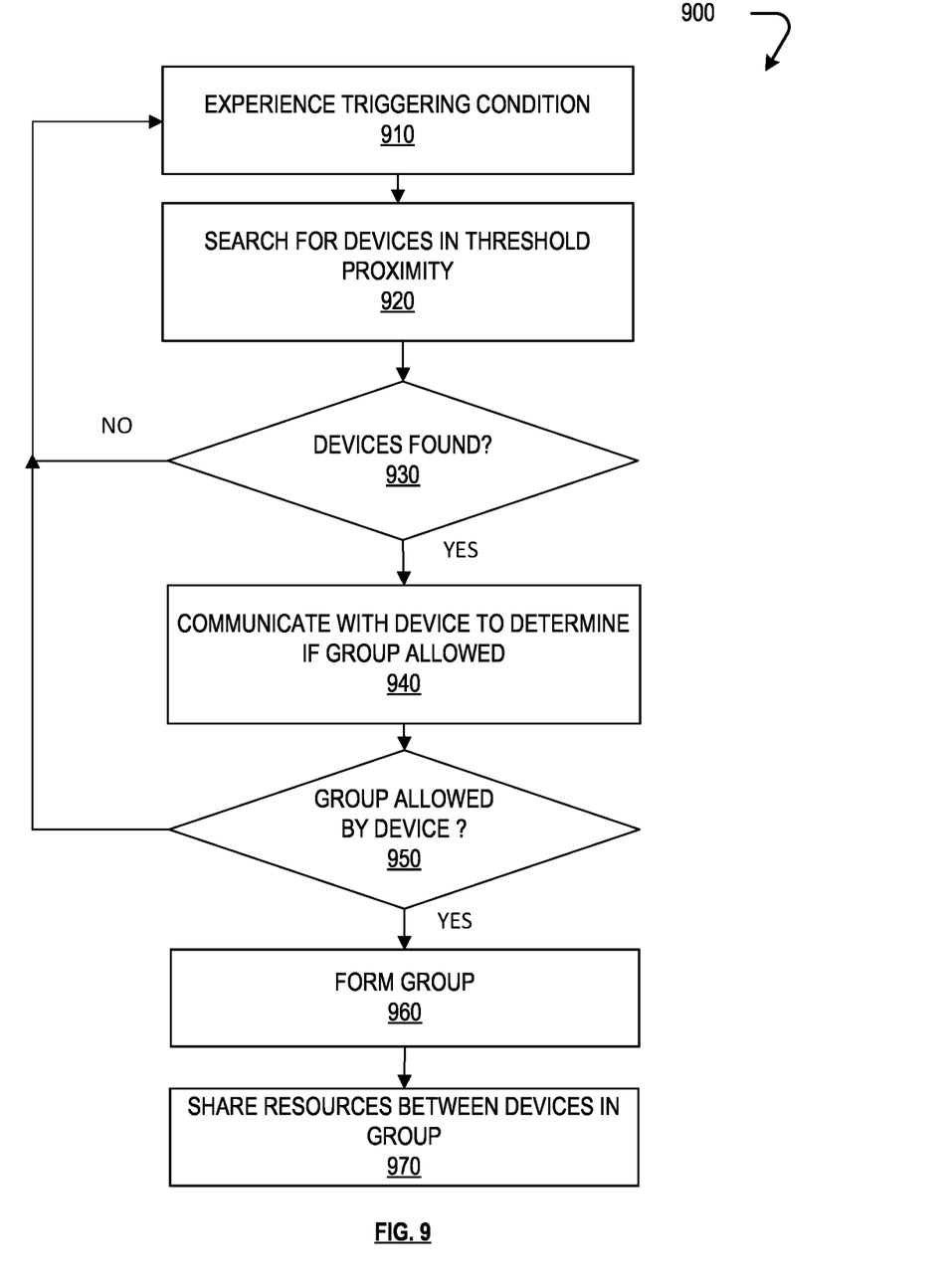
FIG. 9 is a flow chart depicting an additional method for group formation and implementation in accordance with disclosed embodiments.

FIG. 9 illustrates a method 900 for forming a group of wireless devices to improve uplink performance. Method 900 may be performed by a processor, for example, the processor 432 in the wireless device 400. Alternatively, one or more of the steps may be performed by a processor of an access node, such as the processor 311 of the access node 310. For the sake of illustration, the method is described as being performed by the wireless device 400. In some embodiments, the method 900 may be performed in a network under any conditions and in other embodiments, the method 900 may only be performed in a network experiencing load below a predetermined loading threshold.

In step 910, the wireless device 400 compares its current condition to the triggering condition. The wireless device 400 may store the triggering condition in memory. As set forth above, the triggering condition may be or include one or more RF parameters and may additionally or alternatively include location information. The wireless device 400 determines if the current condition, reflected by measured performance parameters or location meets the triggering condition. For example, the wireless device 400 may compare a measured value of SINR or RSRP with a stored threshold. If the measured value meets the threshold, the wireless device 400 experiences the trigger condition and group formation is enabled.

When group formation is enabled, the wireless device searches for devices within a threshold proximity at step 920. As set forth above, the search for proximal devices may be executed utilizing Bluetooth and/or Wi-Fi technologies. The wireless device 400 may initially search using Bluetooth, but if no devices are found utilizing Bluetooth, the wireless device 400 may utilize Wi-Fi to locate proximal devices for group formation.

If no proximal devices are found in step 930, the wireless device 400 may continue to monitor the triggering condition and search for devices if the trigger condition is met. However, if proximal devices are found in step 930, the wireless device 400 communicates with the located device or devices to determine if device settings allow group formation in step 940. Wireless devices may allow group formation with all other wireless devices or with some other wireless device. Some wireless devices may disallow group formation. Furthermore, among the wireless devices that allow group formation, some may disallow group formation if the battery power of the wireless device is below a certain percentage, e.g., 30%.

If group formation is not allowed by the located wireless device in step 950, the wireless device 400 may continue to search for other wireless device as long as the triggering condition is experienced. However, if group formation is allowed by the located device in step 950, the wireless device 400 forms a group with the located wireless device in step 960.

If the access node 310 performs the above steps, the access node 310 may store the triggering condition and may also receive measurement reports, such as channel state information (CSI) reports from the wireless devices in order to compare measured performance parameters to the triggering condition.

In step 970, the wireless devices in the group share resources for uplink transmission. For example, the group resource sharing logic 380 can cause all data links to be combined in order to expand coverage and performance. Further, the group resource sharing logic 380 can cause the wireless devices to pool uplink capabilities by encrypting the data and have one device send data on behalf of the others. In some embodiments, the group resource sharing logic 380 allows each wireless device to have its own radio link. In other embodiments, the group resource sharing logic enables the wireless devices to contribute to a single bearer, thus creating one radio link through combined data rates. In this embodiment, the formed group has one ID, each device sends data that is reassembled by the network. Resource sharing may provide the benefits of range extension, performance improvement, and power density improvements.

In some embodiments, methods 700, 800, and 900 may include additional steps or operations. Furthermore, the methods may include steps shown in each of the other methods. As one of ordinary skill in the art would understand, the methods 700, 800, and 900 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
experiencing a triggering condition at a wireless device in a network;
identifying at least one additional wireless device in the network within a threshold proximity to the wireless device experiencing the triggering condition;
identifying a predetermined group formation setting of the at least one additional wireless device by communicating with the at least one additional wireless device from the wireless device in the network, wherein the predetermined group formation setting allows group formation with other wireless devices in the network;
forming a group with the at least one additional wireless device using a communication link; and
pooling uplink resources by combining data links for the wireless device and the at least one additional wireless device to improve uplink performance of the wireless device experiencing the triggering condition.

2. The method of claim 1, wherein experiencing the triggering condition includes experiencing an RF signal condition threshold.

3. The method of claim 1, wherein experiencing the triggering condition includes experiencing a threshold low uplink throughput.

4. The method of claim 1, wherein experiencing the triggering condition includes the wireless device traveling to a location beyond a predetermined proximity to an access node.

5. The method of claim 1, wherein identifying the at least one additional wireless device within the threshold proximity includes identifying the wireless device through one of Bluetooth and Wi-Fi.

6. The method of claim 1, wherein an access node performs the identification of the at least one additional wireless device.

7. The method of claim 1, wherein the predetermined group formation setting includes a setting allowing group formation with all other wireless devices in the network.

8. The method of claim 1, wherein pooling the uplink resources comprises pooling physical resource blocks (PRBs).

9. The method of claim 1, wherein pooling the uplink resources comprises pooling uplink transmission power.

10. A wireless device comprising:
   at least one processor programmed to perform operations including,
   identifying a triggering condition for forming a group of wireless devices in a network;
   identifying at least one additional wireless device within a threshold proximity to the wireless device experiencing the triggering condition;
   identifying a predetermined group formation setting at the at least one additional wireless device, wherein the predetermined group formation setting allows group formation with other wireless devices in the network;
   forming a group with the at least one additional wireless device using a communication link; and
   pooling uplink resources with the at least one additional wireless device to improve uplink performance of the wireless device experiencing the triggering condition.

11. The wireless device of claim 10, wherein experiencing the triggering condition includes experiencing an RF signal condition threshold.

12. The wireless device of claim 10, wherein experiencing the triggering condition includes experiencing a threshold low uplink throughput.

13. The wireless device of claim 10, wherein experiencing the triggering condition includes the wireless device traveling to a location beyond a predetermined proximity to an access node.

14. The wireless device of claim 10, wherein identifying the at least one additional wireless device within the threshold proximity includes identifying the wireless device through one of Bluetooth and Wi-Fi.

15. The wireless device of claim 10, wherein-identifying the at least one additional wireless device further comprises identifying a predetermined group formation setting allows allowing group formation with all other wireless devices in the network.

16. The wireless device of claim 10, wherein the wireless device functions as a controlling wireless device controlling a data relationship with the network for the group.

17. A system comprising:
   multiple wireless devices;
   an access node in communication with the multiple wireless devices;
   one wireless device of the multiple wireless devices experiencing a triggering condition for forming a group of wireless devices selected from the multiple wireless devices, the one wireless device initiating formation of the group by,
   identifying at least one additional wireless device within a threshold proximity;
   identifying a predetermined group formation setting at the at least one additional wireless device, wherein the predetermined group formation setting allows group formation with other wireless devices in the network;
   forming a group with the at least one additional wireless device using a communication link; and
   pooling uplink resources with the at least one additional wireless device to improve uplink performance of the wireless device experiencing the triggering condition.

18. The system of claim 17, wherein the access node identifies the at least one additional wireless device within the threshold proximity.

19. The system of claim 17, wherein the one wireless device communicates with the at least one additional wireless device using Bluetooth.

* * * * *